Jan. 13, 1931.  C. G. WILDERSON  1,789,125
CUT-OFF GAUGE FOR SAWS
Filed Dec. 24, 1927   3 Sheets-Sheet 1

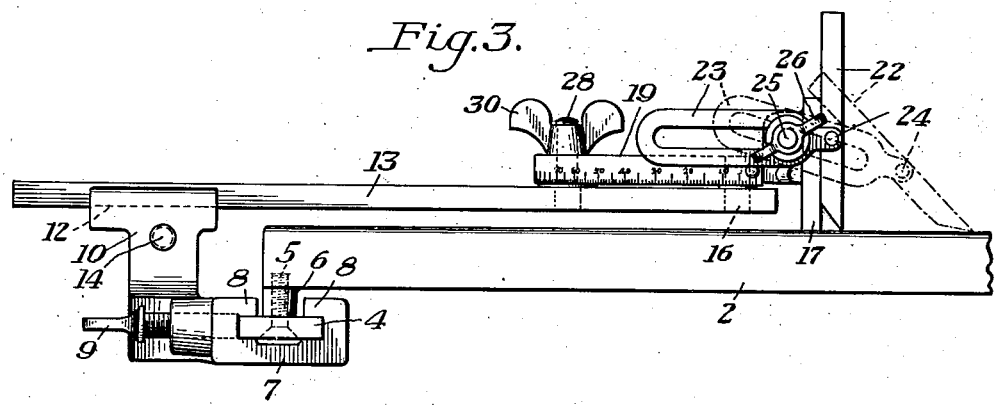
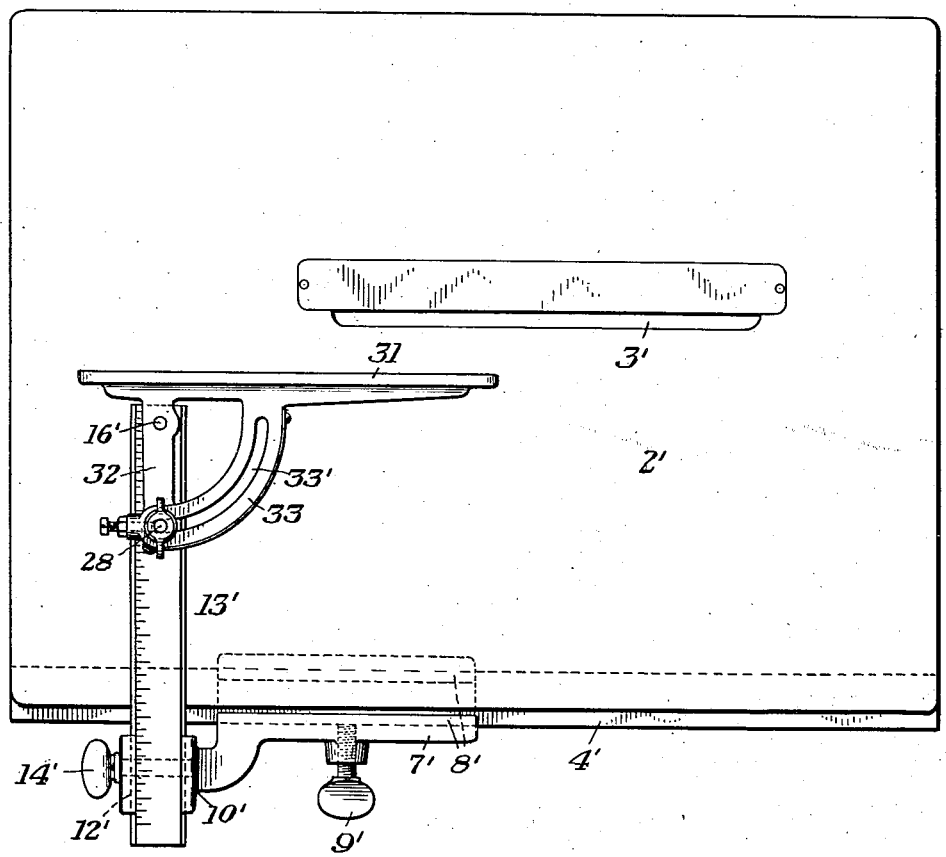

Jan. 13, 1931.  C. G. WILDERSON  1,789,125
CUT-OFF GAUGE FOR SAWS
Filed Dec. 24, 1927  3 Sheets-Sheet 3
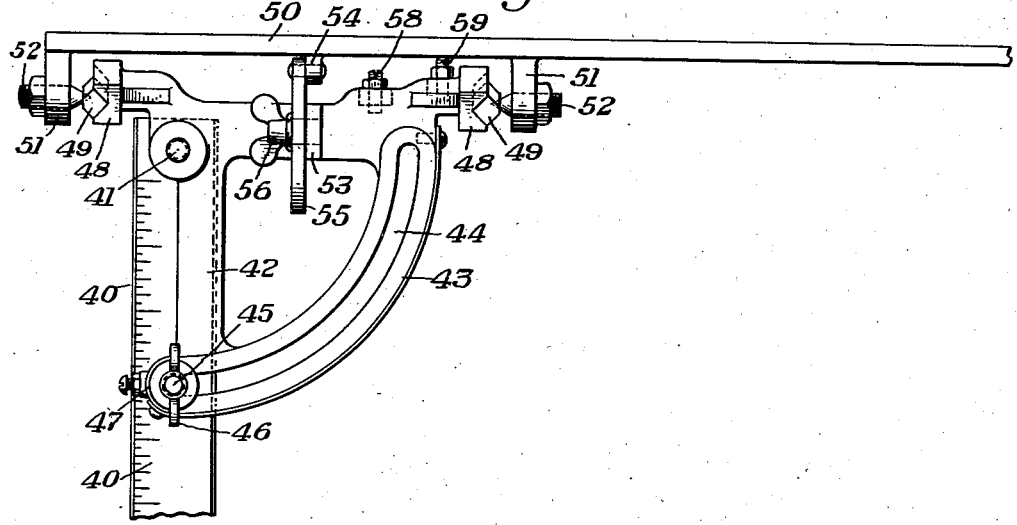
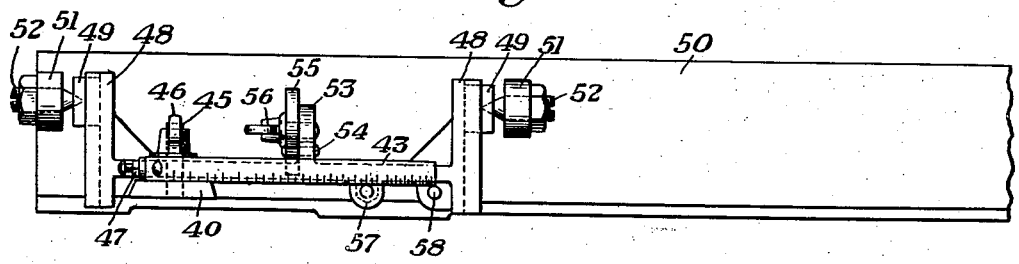
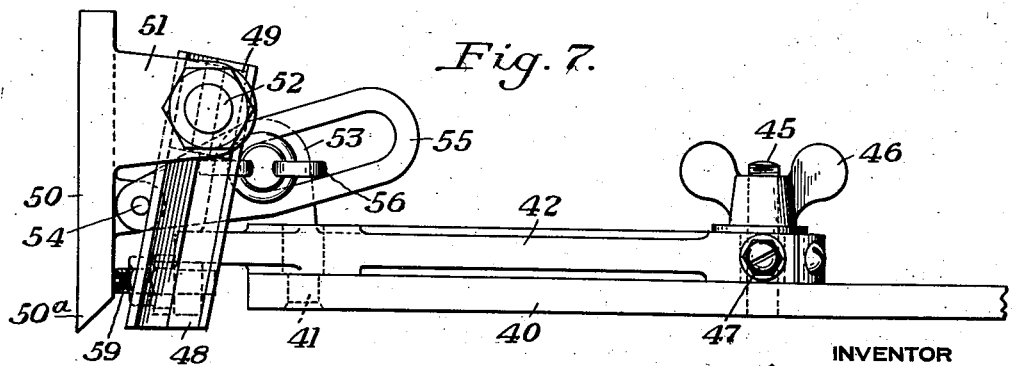

Patented Jan. 13, 1931

1,789,125

UNITED STATES PATENT OFFICE

CLINTON G. WILDERSON, OF LEETONIA, OHIO

CUT-OFF GAUGE FOR SAWS

Application filed December 24, 1927. Serial No. 242,473.

The present invention relates to wood-sawing machinery, and more particularly to a combined ripping guide and cut-off gauge for saws of the revolving disk type.

According to the present invention, it is proposed to provide a combined ripping guide and cut-off gauge which may be applied to the saw table in such a way as not to be in the way or which will not interfere in any way with the operation of the saw. It is further proposed according to the present invention to provide a device of this kind which shall be adjustable to the greatest possible extent in a simple and convenient manner.

The device of the present invention is adaptable to saw tables of the type now in common use, and does not require any alteration or substitution of the saw table.

The invention may be readily understood by reference to the accompanying drawings, in which Figure 1 is a plan view of a saw table having my combined ripping guide and cut-off gauge applied thereto;

Figure 3 is an end elevation, showing the device applied to the saw table;

Figure 4 is a view similar to Figure 1, showing a slightly modified construction;

Figure 5 is a plan view of another modified form of the invention;

Figure 6 is a side elevation of the construction shown in Figure 5; and

Figure 7 is an end view of the construction shown in Figures 5 and 6.

Figure 1:
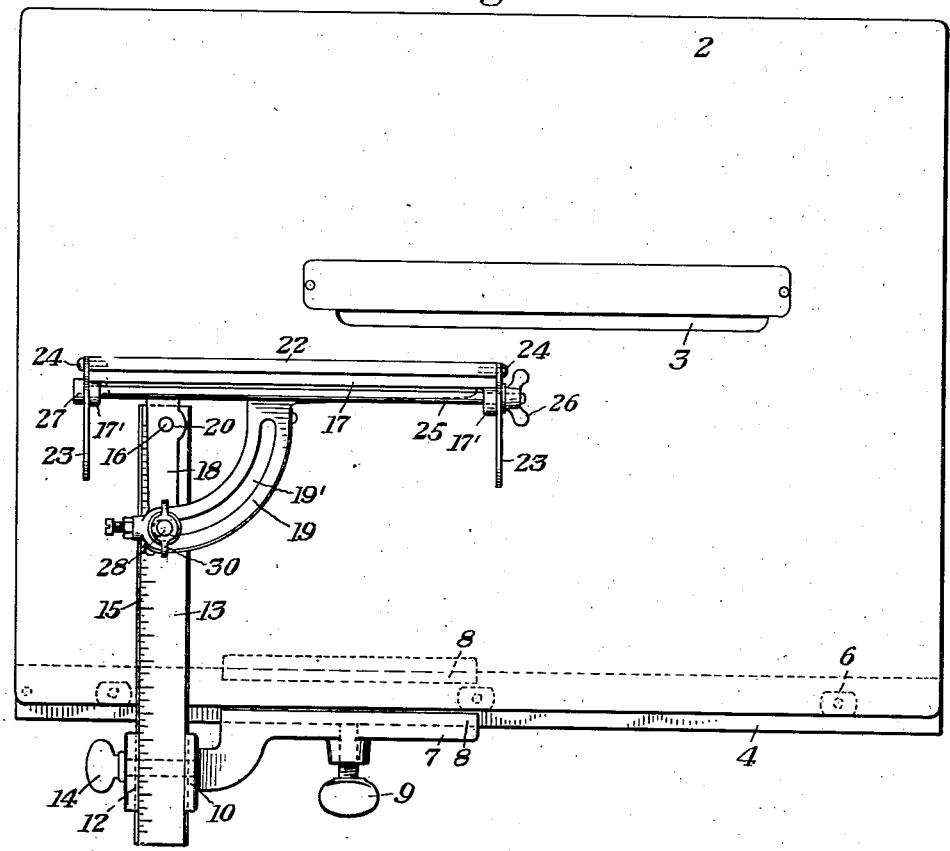
Figure 2:
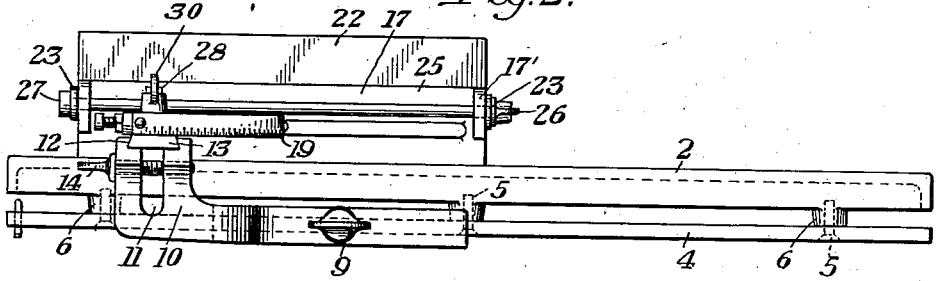
Figure 2 is a side elevation of the device shown in Figure 1.

In the drawings, 2 designates a saw table of common construction having a longitudinally disposed slot 3 therein through which a saw disk, not shown, is adapted to cooperate. Arranged along one side of the saw table and below the level of the top thereof is a slide rail 4 which may be secured to the under side of the table by means of bolts 5, the bar being spaced below the table by means of spacing bosses 6. Mounted to slide along the bar 4 is a shoe or slide member 7, this member having overhanging flanges 8 thereon adapted to ride on the upper surface of the strip 4 to maintain the shoe in place on the strip. The shoe may be adjustably secured in any desired position along the bar 4 by means of a thumb screw or other suitable adjusting means 9.

On the forward end of the shoe 7 is a vertically extending arm 10 that is slightly offset with respect to the shoe so as to be clear of the side of the table. This arm 10 is bifurcated at 11 and has a dove-tailed groove 12 in the top thereof. Transverse bar 13 is slidably received in the dove-tailed groove 12 and a thumb screw 14 serves to adjustably clamp the bar 13 against movement in the groove. The bar 13 preferably has a graduated scale 15 along one edge thereof. On the other end of the bar 13 is a pin 16 which provides a pivot for a supporting device comprised of a crossbar 17, an arm 18 and a scepter-shaped arm 19. The arm 18 has an opening therein at 20 in which the pin 16 is received. Disposed in front of the supporting device 17 is a cut-off gauge or ripping guide 22 in the form of a plate. At each end of this plate is a slotted link 23 pivotally connected with the plate at 24. A clamping rod 25 extends along the member 17 and is supported in lugs 17' at each end thereof. This clamping rod passes through the links 23. The rod has a wing nut 26 at one end thereof and a head 27 at the other end thereof. When the wing nut 26 is tightened, the links 23 will be clamped to thereby adjustably hold the plate 22 in any position to which it may be set.

Secured to the arm 13 back of the pin 16 is a second pin or post 28 that passes through a slot 19' in the scepter-shaped arm 19. A wing nut 30 on the top of the post 28 provides a clamping means for adjustably securing the scepter-shaped arm 19 in any position to which it may be swung.

From the foregoing, it will be seen that the device as a whole may be moved along the table by sliding the shoe 7 along the bar 4. The cut-off guard may be adjusted transversely of the table by moving the bar 13 in the dove-tailed groove 12, and the gauge can be set at any angle horizontally with respect to the slot 3 by means of the adjustment provided in the slotted scepter arm 19 and the pivotal mounting for the device 17 on the pin 16. The links 23 provide for the vertical angular adjustment of the stick or gauge plate 22.

It will thus be seen that a substantially universal adjustment of the gauge plate or ripping guide is obtained and that any desired adjustment can be quickly and easily made. By reason of the disposition of the bar 4 below the table the device is not in the way and the particular way of mounting the guide bar 4 does not require any special modification of the table structure. Whenever it is desired to do so, the shoe 7 with all of the parts supported thereby can be slid off the bar 4 and the saw used without the stop or gauge. When the stop or gauge is removed, the bar 4, being below the table top, does not interfere with the use of the saw in the usual way.

In the modification shown in Figure 4, the same general construction is followed, but in this figure I have shown the cut-off guide as being integral with the scepter arm so that it is not adjustable vertically.

In Figure 4, 2' designates the table, 4' is the slide bar, 7' the shoe which is constructed in the same manner as the shoe described in connection with Figure 1. The transverse slide bar is designated 13' and is similar to the slide bar 13 of Figure 1. This slide bar carries a pin 16' corresponding to pin 16 and a second pin 28' corresponding to pin 28. The combined gripping guide and cut-off gauge is in the form of a plate 31 having a smooth outer face. Connected to the inner face of the plate 31, and preferably integral therewith, is an arm 32 and a scepter shaped arm 33. The two arms intersect. The arm 33 has a slot 33' therein in which the pin 28' is received. The arm 32 has a hole therethrough in which the pin 16' is received to provide a pivotal mounting for the cut-off gauge.

With the arrangement shown in this figure the same adjustments may be made with the same convenience, but the plate 31, being integral with the arm 33, is capable of no vertical angular adjustment.

In the construction shown in Figures 5 to 7, inclusive, 40 is the transversely adjustable bar. Pivoted to the outer end of the bar at 41 is a segmental frame 42 having a curved side 43 in which is an arcuately extending slot 44. Secured to the bar 40 is a post 45 that carries a wing nut 46. The post 45 passes through the slot 44 and the wing nut serves to clamp the frame 42 at any angle to which the frame may be adjusted about the pivot 41. At one end of the curved side member 43 is an adjusting screw 47 which projects into the slot 44. The screw 47 can be adjusted so as to limit the movement of the frame 42, the purpose of this being to provide an accurate stop to prevent movement of the frame past a given position whereby the fence, hereinafter described, can be accurately set parallel to the saw slot in the table. Carried on the frame 42 are two upstanding arms 48. On each arm is a vertically adjustable bearing block 49. The guard or fence is designated 50, and on the rear face of the fence are lugs 51. Each of the lugs 51 carries a trunnion 52 whose inner end engages a bearing block 49.

The frame 42 also carries an upstanding lug 53. Pivotally connected with the back of the fence at 54 is a slotted link 55. A clamping screw 56 passing through the slot in the link 55 and threaded into the lug 53 serves to provide a clamping adjustment for the fence.

By loosening the clamping screw 56 and pushing out on the link 55, the fence may be tilted on the trunnions 52 until it is at the desired angle to the perpendicular. In tilting the fence 50, the lower edge 50ª thereof, which is preferably beveled, moves away from the plane of the saw table. Therefore, as the fence is tilted, the bearing blocks 49 can slide down, thereby always keeping the lower edge of the fence against the saw table. As the fence is pulled back to vertical position, the bearing blocks 49 can ride upwardly.

On the frame 42 is a depending lug 57 which carries a set screw 58 adapted to contact with the side of the arm 40 to adjustably limit the swinging frame 42 in one direction. The set screw 47 limits this movement in one direction and the set screw 58 limits the movement in the other direction.

Also secured to the frame 42 is a set screw 59 against which the fence 50 is adapted to contact when it is swung inwardly toward the vertical position. The set screw 59 can be accurately adjusted to assure of the fence being vertical.

While I have shown and described a preferred embodiment of the invention, it will be understood that various changes and modifications in the construction thereof may be made within the contemplation of my invention and under the scope of the appended claims.

I claim:

1. A cut-off gauge for saw tables comprising a supporting arm, an arcuately adjustable frame on the arm, means for holding the frame in a position to which it is adjusted, a fence, trunnions on the fence, and vertically adjustable bearing members on the frame with which said trunnions engage.

2. A cut-off gauge for saw tables comprising a supporting arm, an arcuately adjustable frame on the arm, means for holding the frame in a position to which it is adjusted, a fence, trunnions on the fence, vertically adjustable bearing members on the frame with which said trunnions engage whereby the fence may be tilted and raised and lowered with respect to the saw table on which the gauge is mounted, and means for adjustably clamping the fence in the position to which it is adjusted.

3. A cut-off gauge for saw tables comprising a supporting arm, a frame pivotally mounted on the arm having an arcuate member thereon, a clamping post on the arm passing through a slot in said member, an adjustable stop at one end of the slotted member for limiting the movement thereof, an adjustable stop on the frame for contacting with the arm to limit the movement of the frame in the opposite direction, a tiltable and vertical adjustable fence on the frame, clamping means for the fence, and an adjustable stop for limiting the tiltable movement of the fence in one direction.

4. A cut-off gauge for saw tables comprising a supporting arm, an arcuately adjustable frame on the arm, means for holding the frame in a position to which it is adjusted, a fence, trunnions on the fence, grooved members on said frame, and bearing members slidable in said grooved members for cooperating with said trunnions.

In testimony whereof I have hereunto set my hand.

CLINTON G. WILDERSON.